(12) United States Patent
Kanda et al.

(10) Patent No.: US 8,811,682 B2
(45) Date of Patent: Aug. 19, 2014

(54) FINGERPRINT AND FINGER VEIN IMAGE CAPTURING AND AUTHENTICATION APPARATUSES

(75) Inventors: Eiji Kanda, Suwa (JP); Tsukasa Eguchi, Matsumoto (JP); Yasunori Hiyoshi, Suwa (JP); Yasushi Tsuchiya, Suwa-gun (JP)

(73) Assignee: Seiko Epson Corporation, Tokyo (JP)

( * ) Notice: Subject to any disclaimer, the term of this patent is extended or adjusted under 35 U.S.C. 154(b) by 645 days.

(21) Appl. No.: 12/727,431

(22) Filed: Mar. 19, 2010

(65) Prior Publication Data

US 2010/0245556 A1   Sep. 30, 2010

(30) Foreign Application Priority Data

Mar. 26, 2009   (JP) .................................. 2009-076198

(51) Int. Cl.
*G06K 9/00* (2006.01)
*G05B 19/00* (2006.01)

(52) U.S. Cl.
USPC ........... 382/116; 382/128; 382/124; 340/5.83

(58) Field of Classification Search
CPC ................. G06K 9/00026; G06K 2009/00932
See application file for complete search history.

(56) References Cited

U.S. PATENT DOCUMENTS

| | | | |
|---|---|---|---|
| 6,888,956 B2 * | 5/2005 | Muramatsu et al. | 382/124 |
| 6,970,234 B2 | 11/2005 | Nagasaka et al. | |
| 2006/0182318 A1 * | 8/2006 | Shigeta | 382/124 |
| 2007/0189583 A1 | 8/2007 | Shimada et al. | |
| 2007/0253607 A1 | 11/2007 | Higuchi | |
| 2007/0285541 A1 * | 12/2007 | Nakashiba | 348/272 |
| 2008/0008365 A1 * | 1/2008 | Hikita et al. | 382/124 |
| 2008/0117409 A1 * | 5/2008 | Nagasaka et al. | 356/71 |
| 2008/0317303 A1 * | 12/2008 | Konno et al. | 382/124 |
| 2009/0228713 A1 * | 9/2009 | Osaka et al. | 713/186 |

FOREIGN PATENT DOCUMENTS

| | | |
|---|---|---|
| JP | 2004-030680 A | 1/2004 |
| JP | 2005-339425 A | 12/2005 |
| JP | 2007-004612 A | 1/2007 |
| JP | 2007-299085 A | 11/2007 |
| JP | 2008-71137 | 3/2008 |
| JP | 2008-102728 | 5/2008 |
| JP | 2008-181468 A | 8/2008 |

* cited by examiner

*Primary Examiner* — Jason M Repko
*Assistant Examiner* — Ryan P Potts
(74) *Attorney, Agent, or Firm* — Oliff PLC (57) ABSTRACT

An image capturing apparatus includes a substrate in which multiple pixel circuits are formed and a driving unit that generates an image signal in which a target has been captured by driving the multiple pixel circuits. When the region in which the multiple pixel circuits is formed is taken as a capturing region, the capturing region includes a fingerprint capturing region for capturing a fingerprint and a vein capturing region for capturing veins.

14 Claims, 5 Drawing Sheets

FINGERPRINT AND FINGER VEIN IMAGE CAPTURING AND AUTHENTICATION APPARATUSES

BACKGROUND

1. Technical Field

The present invention relates to image capturing apparatuses and authentication apparatuses.

2. Related Art

Capturing an image of a fingerprint or a digital vein pattern, extracting characteristic data from the captured image, and comparing that data with already-registered reference data is known as a technique for identifying a user. A more accurate identification is possible if the user is identified using both a fingerprint and a vein.

JP-A-2008-102728 (see FIG. 1) discloses a technique in which an apparatus that identifies and authenticates an individual using fingerprints and veins in this manner is provided with a fingertip fingerprint sensor and a digital vein sensor, whereby the authentication is carried out based on output signals from the stated sensors.

However, the past technique was problematic because providing the fingerprint sensor and digital vein sensor separately increased the size of the apparatus. This technique was also problematic in that the higher number of components led to a higher manufacturing cost. As yet another problem, it was necessary to individually drive two types of sensors, leading to an increase in the amount of power consumed.

SUMMARY

An advantage of some aspects of the invention is apparatus miniaturization, configuration simplification, and a reduction in the amount of power consumed.

An image capturing apparatus according to an aspect of the invention includes a substrate in which multiple pixel circuits are formed, and a driving unit that generates an image signal in which a target has been captured by driving the multiple pixel circuits; when the region in which the multiple pixel circuits is formed is taken as a capturing region, the capturing region includes a fingerprint capturing region for capturing a fingerprint and a vein capturing region for capturing veins.

According to this image capturing apparatus, a fingerprint capturing region and a vein capturing region for capturing veins are provided in a single substrate, and thus it is possible to realize a more miniaturized structure than when providing a fingerprint sensor and a digital vein sensor individually. In addition, the number of components can be reduced, thereby reducing the manufacturing cost as well. Furthermore, it is not necessary to drive individual sensors, thus making it possible to reduce the amount of power consumed.

It is preferable for the aforementioned image capturing apparatus to further include a first filter formed between an imaging surface on which a finger is placed and the fingerprint capturing region, and a second filter formed between the imaging surface and the vein capturing region, and for the first filter to reduce light of the near-infrared ray wavelength region more than of the visible light wavelength region and the second filter to reduce light of the visible light wavelength region more than of the near-infrared ray wavelength region.

Because a fingerprint is unevenness in the epidermis of the human body, fingerprints can be read by reflecting light off of the epidermis. Accordingly, it is preferable to perform such capturing using visible light, which does not penetrate into the human body. On the other hand, veins are inside of the human body, and thus it is necessary for light to enter into the human body in order to scan veins. Accordingly, infrared light, which has a high penetrability, is preferable for use in such capturing. According to this aspect of the invention, the light is filtered using the first filter and the second filter, thus making it possible to improve the detection accuracy for fingerprints and veins.

It is preferable for the aforementioned image capturing apparatus to further include a first light source that emits light toward the first filter through the area between the fingerprint capturing region and the first filter, and a second light source that emits light toward the second filter through the area between the vein capturing region and the second filter.

Alternatively, the aforementioned image capturing apparatus may further include a first light source, provided below the substrate, that emits light toward the first filter, and a second light source, provided below the substrate, that emits light toward the second filter. In this case, the first light source and the second light source are in a region overlapping with the substrate when viewed from above, and thus it is possible to miniaturize the image capturing apparatus in the planar direction.

Furthermore, it is preferable for the first light source to emit light of the visible light region and the second light source to emit light of the near-infrared ray region. Through this, the detection accuracy for fingerprints and veins can be improved.

In addition, in the aforementioned image capturing apparatus, the fingerprint capturing region may be formed in a strip shape, and the vein capturing region may be formed in a strip shape; and the strip-shaped fingerprint capturing region and the strip-shaped vein capturing region may be disposed in an alternating manner. In this case, the first filter is formed in a strip shape, like the fingerprint capturing region, and the second filter is formed in a strip shape, like the vein capturing region. This makes it possible to capture an image in which an image of a fingerprint and an image of veins are mixed together. Accordingly, it is possible to employ the relative positional relationship of the fingerprint and the veins in authentication, thus making it possible to further improve the degree of security.

It is preferable for the aforementioned image capturing apparatus to further include a third light source that emits light toward the first filter and the second filter through the area between the fingerprint capturing region and the vein capturing region, and for the third light source to emit light of both the visible light region and the near-infrared ray region. In this case, the number of light sources can be reduced to one, thus making it possible to reduce the number of components and reduce costs as a result.

Next, an authentication apparatus according to an aspect of the invention includes the aforementioned image capturing apparatus, a generation unit that generates fingerprint data indicating characteristics of a user's fingerprint and vein data indicating characteristics of the user's veins based on an image signal, a comparison unit that compares the generated fingerprint data with pre-registered reference fingerprint data and compares the generated vein data with pre-registered reference vein data, and an authentication unit that authenticates the user as a valid user in the case where the fingerprint data matches the reference fingerprint data and the vein data matches the reference vein data.

According to the invention, authentication is carried out using both a fingerprint and veins, thus making it possible to improve the degree of security.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in detail with reference to the appended drawings. In the drawings, the ratios between the dimensions of the various elements have been changed from the actual ratios in order to facilitate the descriptions. Furthermore, the invention is not limited to the embodiments described hereinafter, and various types of variations achieved by modifying the embodiments, configurations achieved by applying the embodiments or the variations thereon, and so on also fall within the technical scope of the invention. Note also that common elements in the drawings will be given the same reference numerals.

Embodiment

Figure 1:
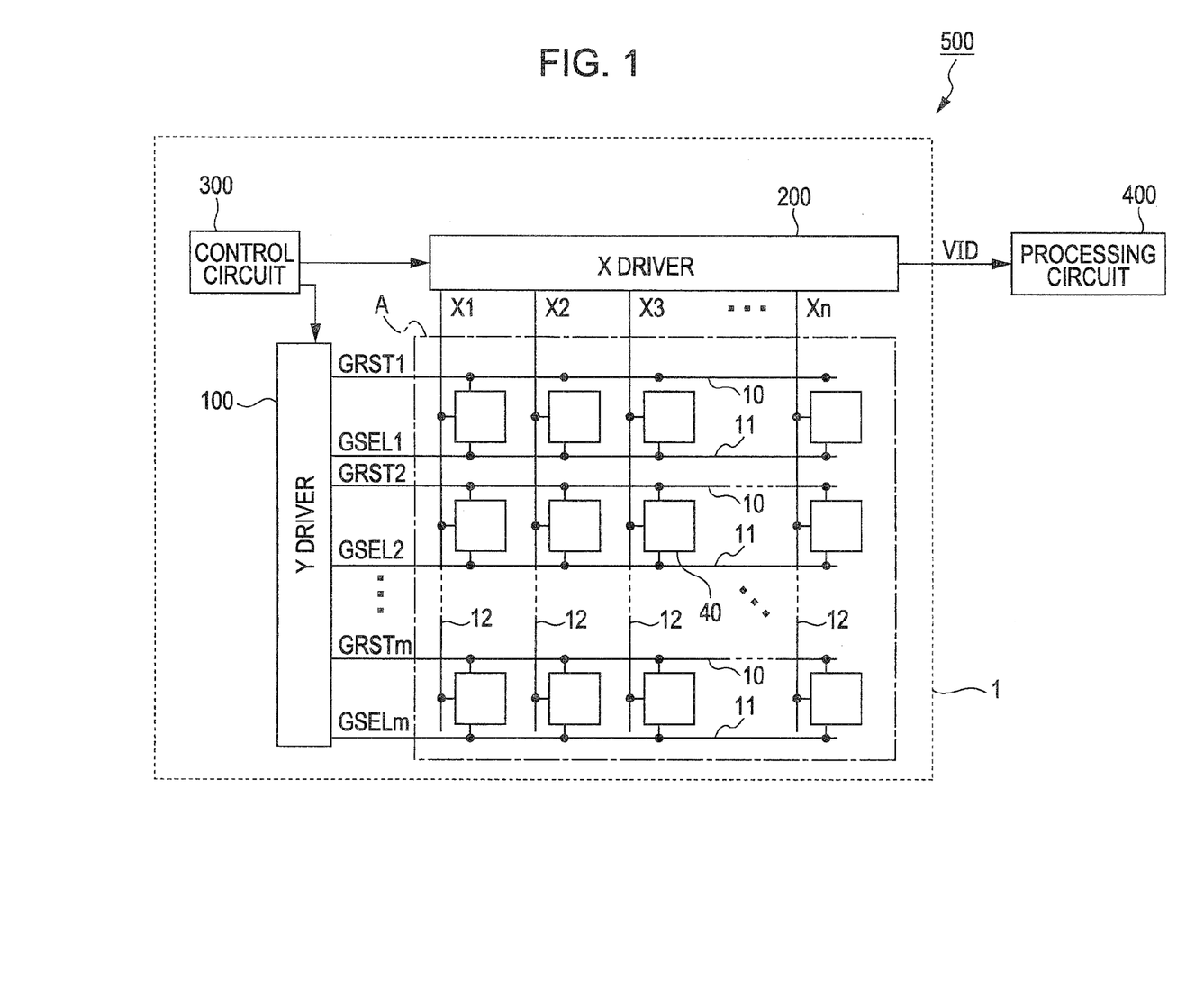
FIG. 1 is a block diagram illustrating the configuration of an authentication apparatus according to an embodiment of the invention.

FIG. 1 is a block diagram illustrating the configuration of an authentication apparatus 500 according to an embodiment of the invention. The authentication apparatus 500 is an apparatus for authenticating a user, and is used when managing the entrance to a room, when logging into a computer, and so on. The authentication apparatus 500 performs authentication from two standpoints, or in other words, using a fingerprint pattern of a user and a vein pattern of the user.

The authentication apparatus 500 includes an image capturing apparatus 1 that outputs an image signal VID and a processing circuit 400 that carries out authentication based on the image signal VID. The image signal VID may be an analog signal or a digital signal.

The image capturing apparatus 1 includes a Y driver 100, an X driver 200, a control circuit 300 that controls the operations of the Y driver 100 and the X driver 200, and a capturing region A. m (where m is a natural number of 2 or more) first control lines 10 and m second control lines 11 parallel to the X direction are formed in the capturing region A. Furthermore, n (where n is a natural number of 2 or more) detection lines 12 are formed parallel to the Y direction. Multiple pixel circuits 40 are provided corresponding to the intersections between the first control lines 10 and the detection lines 12.

The Y driver 100 sequentially supplies reset signals GRST1 to GRSTm to the m first control lines 10 and supplies selection signals GSEL1 to GSELm to the m second control lines 11. The X driver 200 converts data signals X1 to Xn outputted to the n detection lines from parallel format into serial format, and outputs the converted signals to as the image signal VID.

Figure 2:
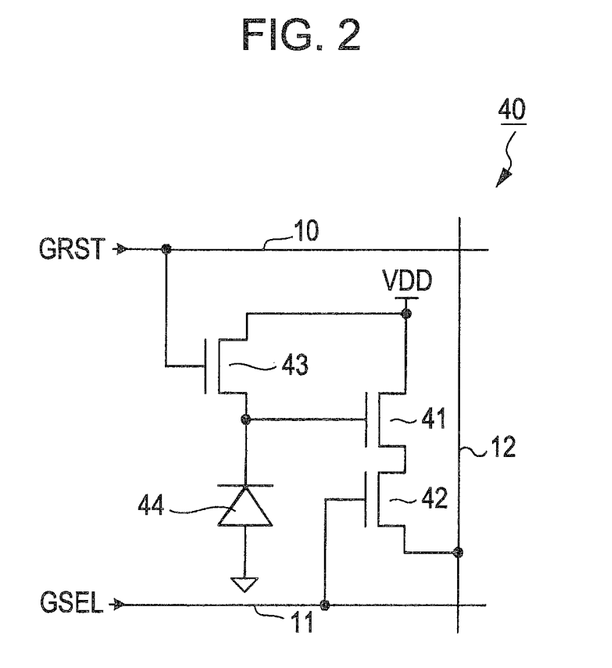
FIG. 2 is a circuit diagram illustrating the configuration of a pixel circuit according to an embodiment of the invention.

FIG. 2 is a circuit diagram illustrating the pixel circuit 40. The pixel circuit 40 includes an amplifying transistor 41, a select transistor 42, a reset transistor 43, and a photodiode 44. The operations of the pixel circuit 40 are divided into a reset period, an exposure period, and an output period. In the reset period, a high-level reset signal GRST is supplied via the first control line 10. As a result, the reset transistor enters an on state, and the gate potential of the amplifying transistor 41 is reset to VDD. At this time, the selection signal GSEL is held at low-level, and the select transistor 42 is in an off state.

In the exposure period, the reset transistor 43 and the select transistor 42 are both in an off state. A current corresponding to the brightness of incident light flows into the photodiode 44. Accordingly, the gate potential of the amplifying transistor 41 changes based on the brightness of the incident light.

In the output period, a high-level selection signal GSEL is supplied via the second control line 11. As a result, the reset transistor 43 enters an off state, whereas the select transistor 42 enters an on state. At this time, a current based on the gate potential of the amplifying transistor 41 flows into the detection line 12 via the select transistor 42. Accordingly, it is possible to capture an image.

Figure 3:
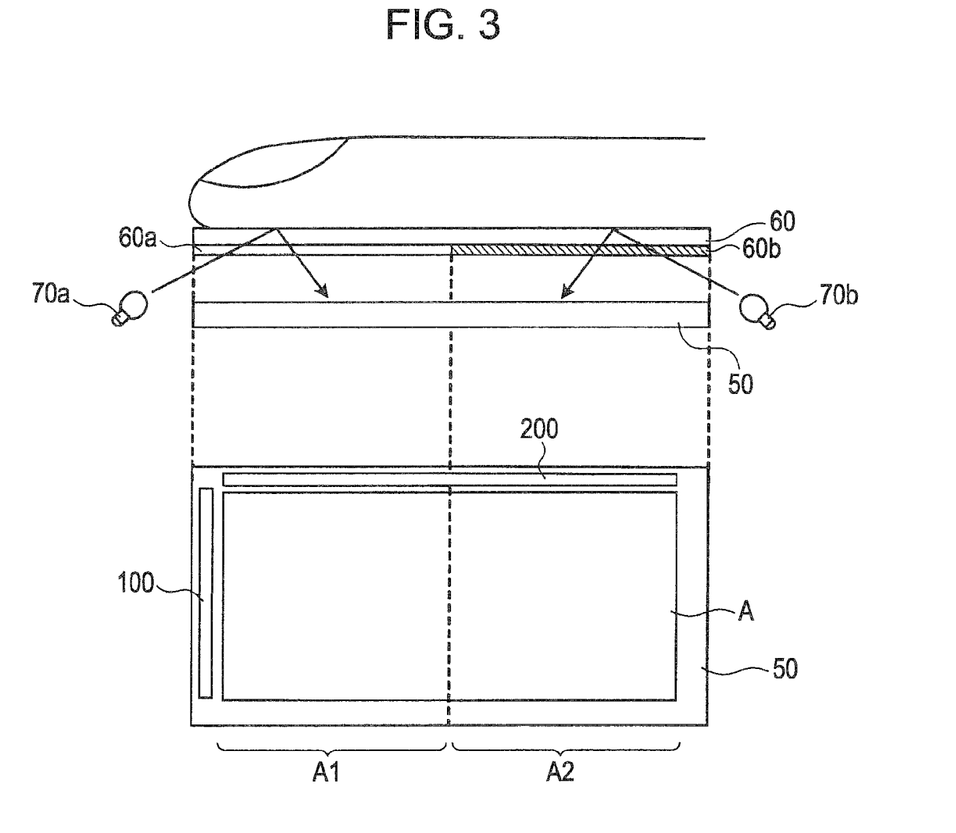
FIG. 3 is a descriptive diagram schematically illustrating an image capturing apparatus according to an embodiment of the invention.

FIG. 3 is a descriptive diagram schematically illustrating the image capturing apparatus 1. As shown in FIG. 3, the image capturing apparatus 1 includes a first substrate 50, a second substrate 60, a first light source 70a, and a second light source 70b. The first substrate 50 is transparent, and glass, for example, is employed as the material thereof. The aforementioned Y driver 100, X driver 200, and capturing region A are formed in the first substrate. The transistors used in these electric circuits are formed using thin-film transistors.

The second substrate 60 is a transparent substrate, and glass, for example, is employed as the material thereof. The top surface of the second substrate 60 serves as an imaging surface on which a user places his or her finger. A first filter 60a and a second filter 60b are formed on the bottom surface (the surface opposing the first substrate 50) of the second substrate 60. The region in which the first filter 60a is formed generally corresponds to the portion of the user's finger extending from the first joint to the fingertip, whereas the region in which the second filter 60b is formed generally corresponds to the portion of the user's finger extending from the first joint to the base. The first filter 60a reduces light of the near-infrared ray wavelength region more than of the visible light wavelength region. To be more specific, the first filter 60a cuts near-infrared rays (800 nm to 2000 nm). On the other hand, the second filter 60b reduces light of the visible light wavelength region more than of the near-infrared ray wavelength region. To be more specific, the second filter 60b cuts visible light (less than 800 nm).

Next, the first light source 70a emits light of the visible light region, whereas the second light source 70b emits light of the near-infrared ray region. Note, however, that the first light source 70a may emit light that is outside of the visible light region, and the second light source 70b may emit light that is outside of the near-infrared ray region. The first light source 70a emits light toward the first filter 60a through the area between the first substrate 50 and the second substrate

60. The second light source 70b emits light toward the second filter 60b through the area between the first substrate 50 and the second substrate 60.

The capturing region A formed in the first substrate 50 includes a fingerprint capturing region A1 and a vein capturing region A2. The fingerprint capturing region A1 is provided corresponding to the first filter 60a, whereas the vein capturing region A2 is provided corresponding to the second filter 60b.

Light from the first light source 70a passes through the area between the fingerprint capturing region A1 and the first filter 60a, passes through the first filter 60a, and is reflected by the user's fingertip. The reflected light enters the fingerprint capturing region A1 via the first filter 60a. On the other hand, light from the second light source 70b passes through the area between the vein capturing region A2 and the second filter 60b, passes through the second filter 60a, and is reflected by the user's finger. The reflected light enters the vein capturing region A2 via the second filter 60b.

Figure 4:
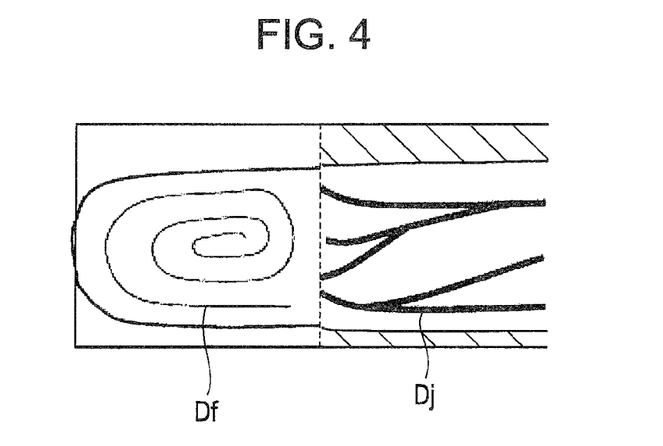
FIG. 4 is a descriptive diagram illustrating an example of a captured image.

Accordingly, an image such as that shown in FIG. 4 is captured. The left half of this image is a fingerprint portion of the fingertip, whereas the right half of the image corresponds to the veins. The processing circuit 400 (mentioned later) generates fingerprint data Df from the image of the fingerprint capturing region A1 and generates vein data Dj from the image of the vein capturing region A2.

Visible light is suited to capturing images of fingerprints, which are on the surface of the human body, whereas infrared light is suited to capturing images of veins, which are on the inside of the human body. As described above, the fingerprint capturing region A1 is irradiated with visible light, whereas the vein capturing region A2 is irradiated with infrared light. It is thus possible to accurately detect both a fingerprint and veins.

Next, the processing circuit 400 illustrated in FIG. 1 executes the following processes.

First, the processing circuit 400 executes a data generation process, generating fingerprint data Df indicating characteristics of a user's fingerprint and vein data Dj indicating characteristics of the user's veins based on the image signal VID.

Second, the processing circuit 400 executes a comparison process, comparing the fingerprint data Df with pre-registered reference fingerprint data Dfr and comparing the generated vein data Dj with pre-registered reference vein data Djr. Note that the reference fingerprint data Dfr and the reference vein data Djr are stored in a non-volatile memory, and are read out therefrom as necessary.

Third, the processing circuit 400 executes an authentication process, authenticating the user as a valid user in the case where the fingerprint data Df matches the reference fingerprint data Dfr and the vein data Dj matches the reference vein data Djr.

Note that the configuration may be such that the reference fingerprint data Dfr, the reference vein data Djr, and passwords of multiple users are stored in the non-volatile memory in association with each other, and when a password is inputted via an input unit such as a keyboard or the like, the reference fingerprint data Dfr and the reference vein data Djr corresponding to the inputted password are read out from the non-volatile memory.

As described thus far, according to the image capturing apparatus 1 in this embodiment, the fingerprint capturing region A1 and the vein capturing region A2 are formed in the first substrate 50. Accordingly, a more miniaturized structure can be achieved than when configuring the two regions using different substrates. Furthermore, because the fingerprint capturing region A1 and the vein capturing region A2 operate as a single capturing region A, the Y driver 100 and the X driver 200 can be employed for the dual purposes of scanning fingerprints and scanning veins. Accordingly, the configuration can be simplified and the costs involved therewith can be reduced, and furthermore, the amount of power consumed thereby can be reduced as well.

Variations

The invention is not intended to be limited to the aforementioned embodiment, and the following variations, for example, are also possible.

Figure 5:
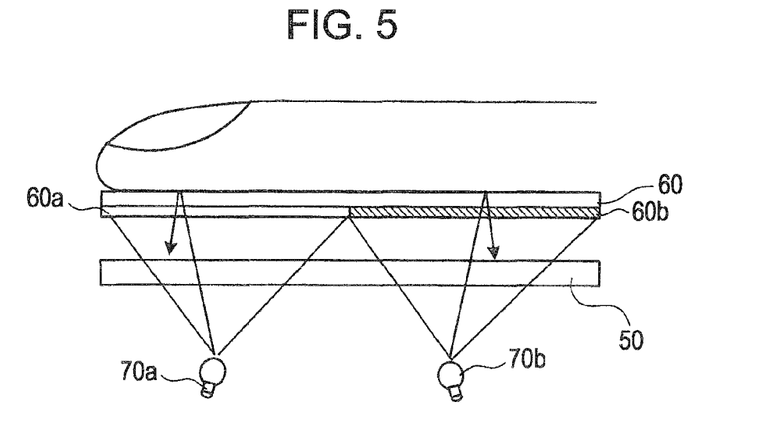
FIG. 5 is a descriptive diagram schematically illustrating an image capturing apparatus according to a variation on the invention.

(1) Although the aforementioned embodiment describes the first light source 70a and the second light source 70b as being disposed so that the light therefrom enters between the first substrate 50 and the second substrate 60, the invention is not limited thereto, and the first light source 70a and the second light source 70b may be disposed below the first substrate 50, as shown in FIG. 5.

In this case, the light passes through the first substrate 50. Accordingly, it is preferable to provide a light-blocking layer below the photodiode 44 so that the light from the first light source 70a and the second light source 70b does not enter directly.

According to this variation, the first light source 70a and second light source 70b, the first substrate 50, and the second substrate 60 can be disposed in an overlapping manner, thus making it possible to further miniaturize the image capturing apparatus 1.

Figure 6:
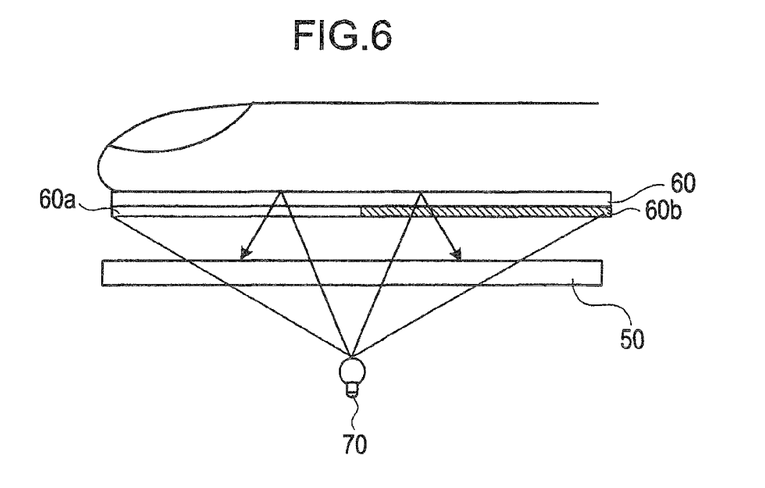
FIG. 6 is a descriptive diagram schematically illustrating an image capturing apparatus according to a variation on the invention.

(2) In addition, a single light source 70 may be employed instead of the first light source 70a and the second light source 70b, as shown in FIG. 6. In this case, the light source 70 emits light toward the first filter 60a and the second filter 60b through the fingerprint capturing region A1 and the vein capturing region A2. In addition, the first light source 70 emits light of both the visible light region and the near-infrared ray region.

According to this variation, the number of light sources can be reduced, thus making it possible to miniaturize the apparatus as well as reduce the costs involved therewith. Note that it is preferable, in terms of the efficient use of light, for the light source 70 to be provided in a position corresponding to the border between the fingerprint capturing region A1 and the vein capturing region A2, or in a position corresponding to the border between the first filter 60a and the second filter 60b.

Figure 7:
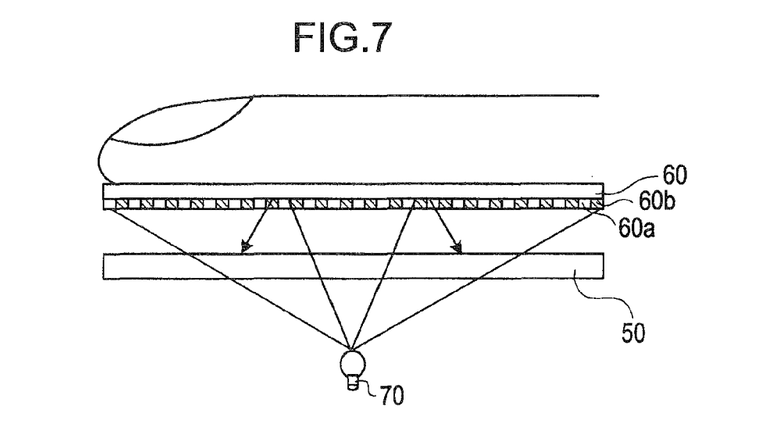
FIG. 7 is a descriptive diagram schematically illustrating an image capturing apparatus according to a variation on the invention.

(3) In addition, the single light source 70 may be employed instead of the first light source 70a and the second light source 70b, and a strip-shaped first filter 60a and a strip-shaped second filter 60b may be provided on the bottom surface of the second substrate 60, as shown in FIG. 7. In this case, the strip-shaped first filter 60a and the strip-shaped second filter 60b are disposed in an alternating fashion. The fingerprint capturing region A1 corresponds to the strip-shaped first filter 60a and the vein capturing region A2 corresponds to the strip-shaped second filter 60b, and thus a strip-shaped fingerprint capturing region A1 and a strip-shaped vein capturing region A2 are disposed in an alternating fashion.

In this case, images of a fingerprint and veins are obtained in alternating strips. By mixing the two images together in this fashion, it is possible to carry out authentication based on the relative positional relationship between the veins and the fingerprint. This makes it possible to further improve the degree of security.

Figure 8:
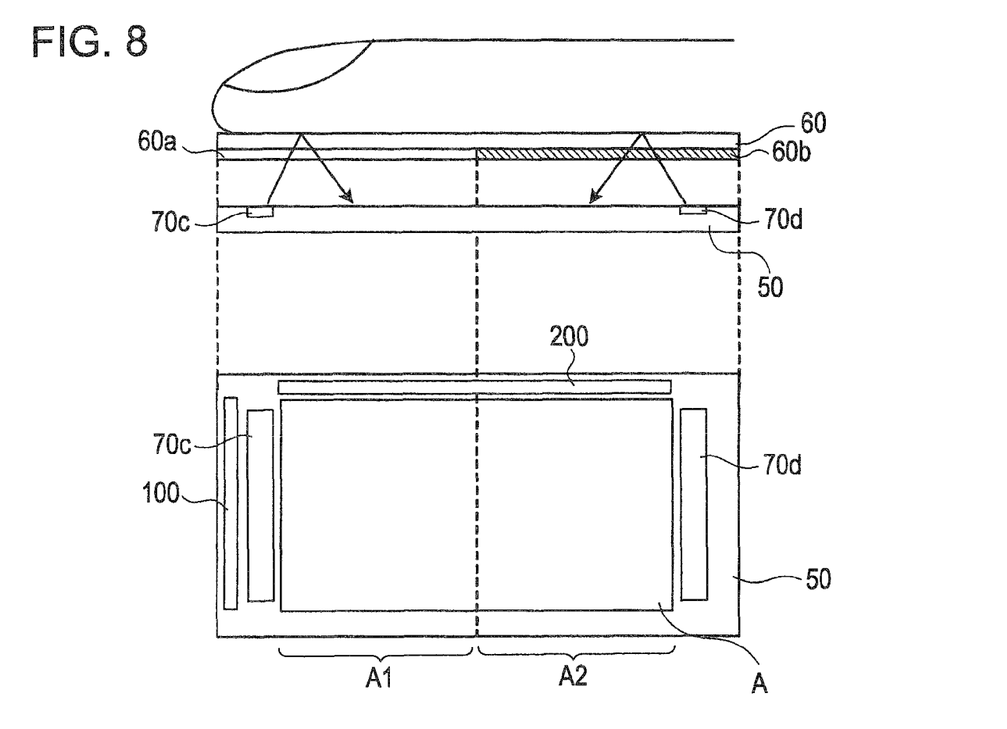
FIG. 8 is a descriptive diagram schematically illustrating an image capturing apparatus according to a variation on the invention.

(4) In addition, a first light-emitting element 70c and a second light-emitting element 70d may be provided in the first substrate 50 instead of the first light source 70a and the second light source 70b, as shown in FIG. 8. In this case, the first light-emitting element 70c and the second light-emitting element 70d may be provided on the outside of the capturing region A, as shown in FIG. 8, or may be provided in the inside of the capturing region A.

The first light-emitting element 70c and the second light-emitting element 70d may be configured of OLED elements. Furthermore, the first light-emitting element 70c emits light of the visible light region, like the first light source 70a, whereas the second light-emitting element 70d emits light of the near-infrared ray region, like the second light source 70b. Note, however, that the first light-emitting element 70c may emit light that is outside of the visible light region, and the second light-emitting element 70b may emit light that is outside of the near-infrared ray region.

Application Example

Next, an electronic device in which the image capturing apparatus according to the invention has been applied will be described.

Figure 9:
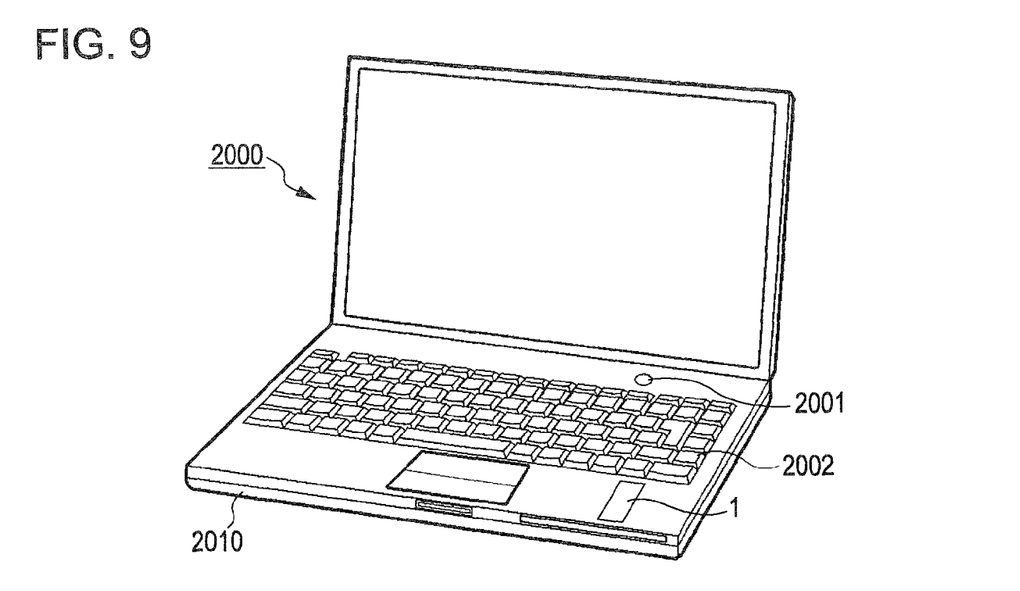
FIG. 9 is a perspective view illustrating a specific example of an electronic device according to an applied example of the invention.

FIG. 9 is a perspective view illustrating the configuration of a mobile personal computer that employs the authentication apparatus 500 according to the above embodiment in its display device. A personal computer 2000 includes the image capturing apparatus 1 serving as its display device, and a main body portion 2010. The main body portion 2010 is provided with a power switch 2001 and a keyboard 2002. In addition, the image capturing apparatus 1 is provided in the main body portion 2010. Note that the processing circuit 400 of the authentication apparatus 500 may be realized by the CPU of the personal computer 2000. According to this personal computer, users can be authenticated, and thus it is possible to improve the degree of security.

An ATM, mobile telephone, entry/exit management device, and so on can be given as other examples of devices in which the authentication apparatus according to the invention can be applied.

What is claimed is:

1. An image capturing apparatus comprising:
   a substrate in which multiple pixel circuits are formed, each of the pixel circuits containing a photodiode;
   a driving unit that generates an image signal in which a target has been captured by driving the multiple pixel circuits,
   a first filter formed between an imaging surface on which a finger is placed and a fingerprint capturing region, the first filter being configured to transmit light less than 800 nm;
   a second filter located adjacent to the first filter formed between the imaging surface and a vein capturing region, the second filter being configured to transmit light greater than 800 nm;
   a first light source that emits light toward the first filter through the area between the fingerprint capturing region and the first filter; and
   a second light source that emits light toward the second filter through the area between the vein capturing region and the second filter,
   wherein when the substrate in which the multiple pixel circuits is formed is a capturing region containing an array of the photodiodes, the capturing region including both the fingerprint capturing region for capturing a fingerprint and the vein capturing region for capturing veins, and
   the first light source emits light of a first wavelength region and is positioned beneath the fingerprint capturing region, and the second light source emits light of a second wavelength region and is positioned beneath the vein capturing region, and the fingerprint capturing region and the vein capturing region are opposite from one another and overlap with the substrate when viewed from above.

2. The image capturing apparatus according to claim 1, further comprising:
   the first filter reducing light of the near-infrared ray wavelength region more than of the visible light wavelength region; and
   the second filter reducing light of the visible light wavelength region more than of the near-infrared ray wavelength region.

3. An authentication apparatus comprising:
   the image capturing apparatus according to claim 2;
   a generation unit configured to generate fingerprint data indicating characteristics of a user's fingerprint and vein data indicating characteristics of the user's veins based on an image signal;
   a comparison unit configured to compare the generated fingerprint data with pre-registered reference fingerprint data and to compare the generated vein data with pre-registered reference vein data; and
   an authentication unit configured to authenticate the user as a valid user in the case where the fingerprint data matches the reference fingerprint data and the vein data matches the reference vein data.

4. The image capturing apparatus according to claim 1, further comprising:
   a first light source, provided below the substrate, that emits light toward the first filter; and
   a second light source, provided below the substrate, that emits light toward the second filter.

5. An authentication apparatus comprising:
   the image capturing apparatus according to claim 4;
   a generation unit configured to generate fingerprint data indicating characteristics of a user's fingerprint and vein data indicating characteristics of the user's veins based on an image signal;
   a comparison unit configured to compare the generated fingerprint data with pre-registered reference fingerprint data and to compare the generated vein data with pre-registered reference vein data; and
   an authentication unit configured to authenticate the user as a valid user in the case where the fingerprint data matches the reference fingerprint data and the vein data matches the reference vein data.

6. The image capturing apparatus according to claim 1, wherein the first light source emits light of the visible light region and the second light source emits light of the near-infrared ray region.

7. An authentication apparatus comprising:
   the image capturing apparatus according to claim 6;
   a generation unit configured to generate fingerprint data indicating characteristics of a user's fingerprint and vein data indicating characteristics of the user's veins based on an image signal;
   a comparison unit configured to compare the generated fingerprint data with pre-registered reference fingerprint data and to compare the generated vein data with pre-registered reference vein data; and
   an authentication unit configured to authenticate the user as a valid user in the case where the fingerprint data matches the reference fingerprint data and the vein data matches the reference vein data.

8. The image capturing apparatus according to claim 1,
wherein the fingerprint capturing region is formed in a strip shape, and the vein capturing region is formed in a strip shape; and
the strip-shaped fingerprint capturing region and the strip-shaped vein capturing region are disposed in an alternating manner.

9. An authentication apparatus comprising:
the image capturing apparatus according to claim 8;
a generation unit configured to generate fingerprint data indicating characteristics of a user's fingerprint and vein data indicating characteristics of the user's veins based on an image signal;
a comparison unit configured to compare the generated fingerprint data with pre-registered reference fingerprint data and to compare the generated vein data with pre-registered reference vein data; and
an authentication unit configured to authenticate the user as a valid user in the case where the fingerprint data matches the reference fingerprint data and the vein data matches the reference vein data.

10. The image capturing apparatus according to claim 1, further comprising:
a third light source that emits light toward the first filter and the second filter through the area between the fingerprint capturing region and the vein capturing region,
wherein the third light source emits light of both the visible light region and the near-infrared ray region.

11. An authentication apparatus comprising:
the image capturing apparatus according to claim 10;
a generation unit configured to generate fingerprint data indicating characteristics of a user's fingerprint and vein data indicating characteristics of the user's veins based on an image signal;
a comparison unit configured to compare the generated fingerprint data with pre-registered reference fingerprint data and to compare the generated vein data with pre-registered reference vein data; and
an authentication unit configured to authenticate the user as a valid user in the case where the fingerprint data matches the reference fingerprint data and the vein data matches the reference vein data.

12. An authentication apparatus comprising:
the image capturing apparatus according to claim 1;
a generation unit configured to generate fingerprint data indicating characteristics of a user's fingerprint and vein data indicating characteristics of the user's veins based on an image signal;
a comparison unit configured to compare the generated fingerprint data with pre-registered reference fingerprint data and to compare the generated vein data with pre-registered reference vein data; and
an authentication unit configured to authenticate the user as a valid user in the case where the fingerprint data matches the reference fingerprint data and the vein data matches the reference vein data.

13. The image capturing apparatus according to claim 1, the fingerprint capturing region is a different region from the vein capturing region.

14. An authentication apparatus comprising:
the image capturing apparatus according to claim 13;
a generation unit configured to generate fingerprint data indicating characteristics of a user's fingerprint and vein data indicating characteristics of the user's veins based on an image signal;
a comparison unit configured to compare the generated fingerprint data with pre-registered reference fingerprint data and to compare the generated vein data with pre-registered reference vein data; and
an authentication unit configured to authenticate the user as a valid user in the case where the fingerprint data matches the reference fingerprint data and the vein data matches the reference vein data.

* * * * *